Sept. 6, 1966 A. ENGLER 3,270,757
DUAL DIAPHRAGM PRESSURE REGULATOR
Filed Oct. 1, 1963 2 Sheets-Sheet 1
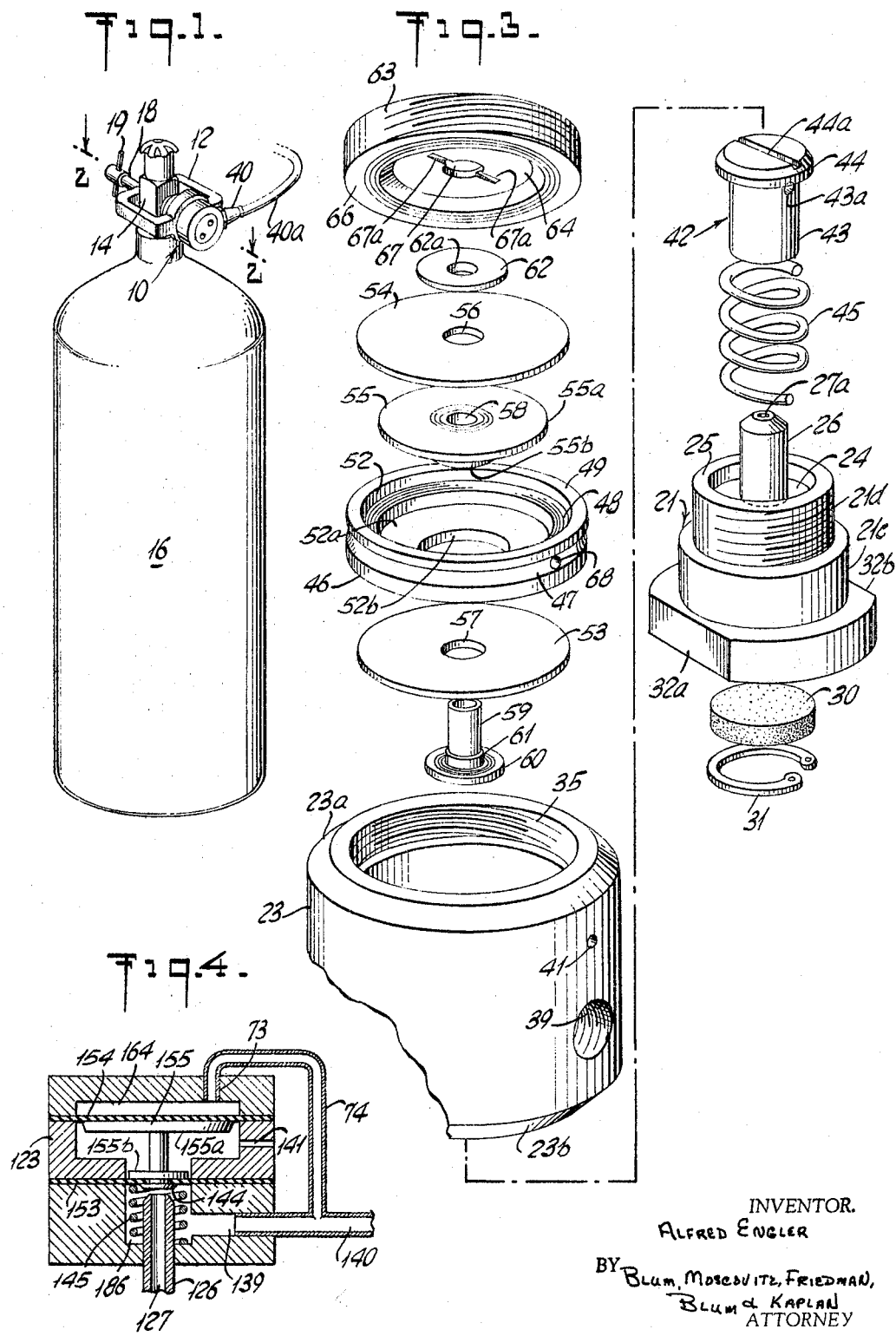
INVENTOR.
ALFRED ENGLER
BY Blum, Moscovitz, Friedman,
Blum & Kaplan
ATTORNEY

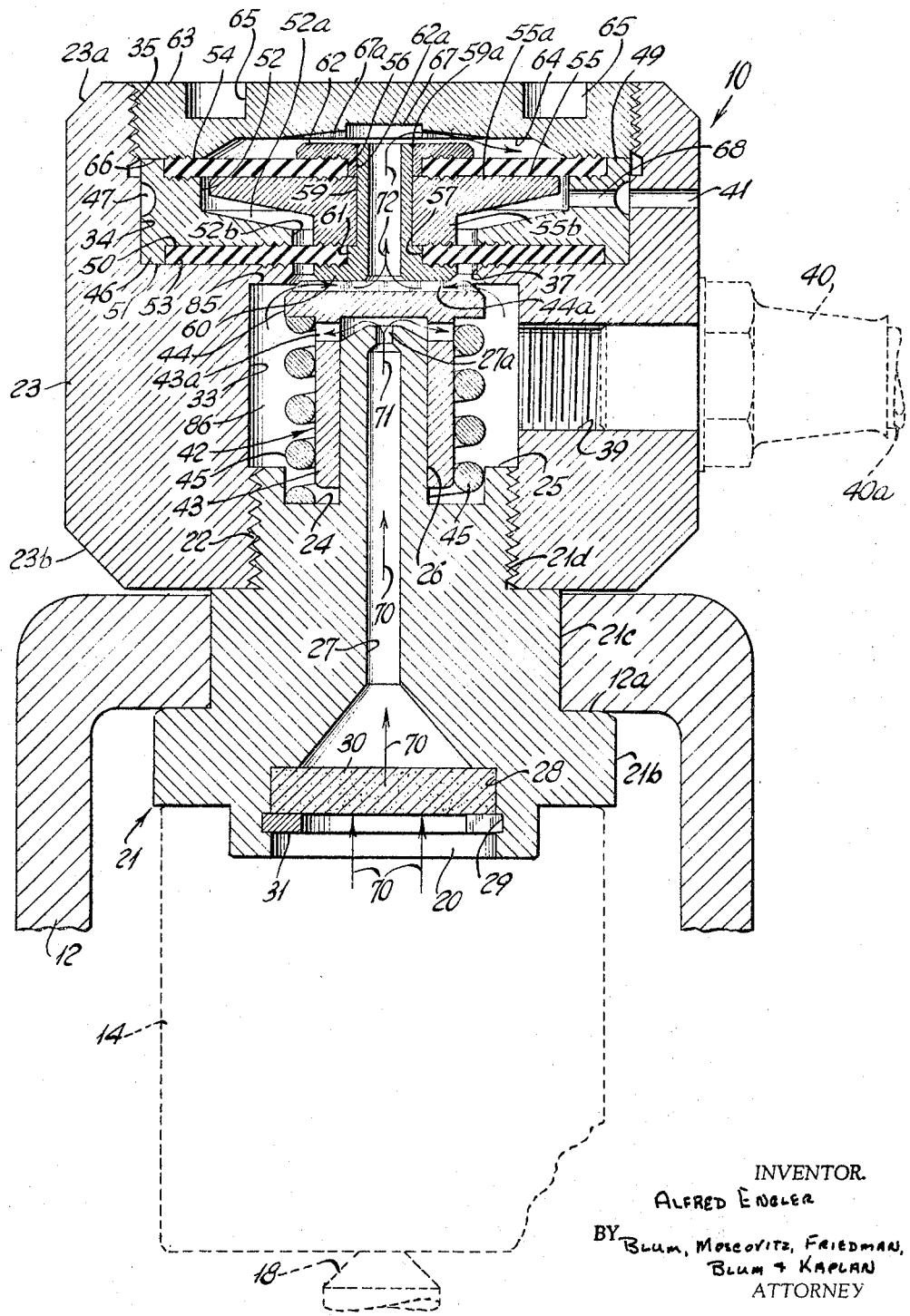

3,270,757
DUAL DIAPHRAGM PRESSURE REGULATOR
Alfred Engler, 1037 NE. 88th St., Miami, Fla.
Filed Oct. 1, 1963, Ser. No. 312,985
9 Claims. (Cl. 137—64)

This invention relates generally to an air pressure regulator and more particularly to a first stage air pressure regulator stage for use in diving apparatus.

Although the device of the present invention is designed primarily for use as a first stage air pressure regulator in diving apparatus of the type carried on the person of the diver, it is to be noted that all of the advantageous features of the present invention which have use in related fields are intended to be covered herein.

Conventionally, two air pressure regulators (a "first stage" and a "second stage") are utilized in diving equipment of the type which is worn about the body of the diver to reduce the air pressure to a safe value which can be applied to the lungs of the diver. The so-called first stage regulator is usually mounted on the tank of compressed air and drops the air pressure from the tank pressure of approximately 2,300 p.s.i. to approximately 100 p.s.i. The second stage air pressure regulator is usually located in the mouthpiece of the diving apparatus and drops the pressure of the air coming from the first stage regulator from the approximate 100 p.s.i. to ambient pressure. The first stage regulator operates to regulate the pressure of the air coming from the tank during the time the diver is exhaling. That is, the outlet of the first stage regulator is closed when the diver is exhaling and open when the diver is inhaling.

One object of the present invention is to provide a first stage regulator which is relatively simple in construction and requires no manual adjustment to maintain a predetermined air pressure at the output thereof.

Another object of the present invention is to provide a first stage regulator which has a relatively fast response.

Another object of the present invention is to provide a first stage regulator which requires a minimum of parts for efficient operation.

Another object of the present invention is to provide a first stage regulator which may be very easily disassembled for cleaning purposes and which can be reassembled without the need for readjusting the pressure determining elements.

In accordance with the above objectives, the present invention comprises a number of elements which form a housing having two chambers therein of differing cross sections, the cross section of one chamber being larger than the cross section of the other chamber. Flexible diaphragms extend transversely across the end of each of the chambers and are maintained in place by an insert ring. The diaphragms define an intermediate chamber between their facing surfaces. A passage connects the intermediate chamber to the surroundings. A piston lies within the intermediate chamber and connects the facing surfaces of both diaphragms so that downward flexing of the upper diaphragm will be transmitted to the lower diaphragm. The insert ring and piston are so shaped so that the flexible area of the diaphragm associated with the chamber having the larger cross section will be greater than the flexible area of the diaphragm associated with the chamber having the smaller cross section. A passage connects the chambers through the piston and the diaphragms. A nozzle projects axially upwardly into the chamber having the smaller cross section and is connected to the source of compressed air. A valve member having a hollow interior and a transverse head is slidably mounted to the nozzle and is so positioned so that downward flexing of the diaphragms will cause the valve member to move downwardly until the under side of the head seats upon the nozzle outlet thereby sealing off the supply of compressed air. The valve member is biased upwardly, away from the nozzle outlet and into abutting engagement with the lower surface of the diaphragm extending across the chamber having the smaller cross section, by a biasing spring. A threaded aperture in the housing connects with the chamber having the smaller cross section and receives an exhaust hose therein which connects to the second stage regulator.

If it is assumed that the apparatus is in use and the diver is exhaling, then the outlet of the present device will effectively be closed. Air, coming from the compressed air supply, will pass through the nozzle, and, together with the biasing spring, will force the head of the valve member away from the nozzle outlet and into abutting engagement with the aforementioned diaphragm surface. Air will flow out of the nozzle into the chamber having the smaller cross section and through the connecting passage into the chamber having the larger cross section. The pressure building up in the chamber having the larger cross section will cause the diaphragm associated with this chamber, and therefore the piston, to flex downwardly thereby causing the diaphragm associated with the chamber having the smaller cross section to likewise flex downwardly to move the head of the abutting valve member into seating engagement with the nozzle outlet thereby shutting off the flow of air. Thus, an equilibrium condition will be maintained wherein the pressure existing at the outlet of the first stage regulator will be determined solely by the biasing spring and the dimensions of the chambers and the diaphragms.

When the diver begins to inhale, the outlet is effectively opened and the pressure which has heretofore built up within the chambers of the first stage regulator suddenly drops. The pressure of the air from the compressed air tank together with the force exerted by the bias spring will thereupon force the head of the valve member away from the nozzle outlet thereby allowing the air to flow into the chamber having the smaller cross section and hence, through the exhaust hose to the second stage regulator. As soon as the diver begins to exhale again the equilibrium condition is established almost immediately, thereby providing a first stage regulator having a fast response.

As the diver progresses down to greater depths, the pressure of the water increases. This increased water pressure is exerted against the lungs of the diver, and to maintain the same differential pressure between the air pressure entering the diver's lungs at sea level and the ambient pressure, the pressure of the air from the first stage regulator will likewise have to be increased. This increase is automatically compensated for in the present invention in the following manner. The water will enter the intermediate chamber through the passage noted herein above. Since the area associated with one diaphragm is smaller than the area associated with the other diaphragm, the water pressure will create a net force against the diaphragm having the larger area. This force will be in a direction which will cause the diaphragm associated with the chamber having the larger cross section to move upwardly, and, through the connecting piston, move the other diaphragm upwardly, thereby allowing the head of the valve member to unseat itself from the nozzle outlet. Thus, an increased air pressure will be required to flex this diaphragm downwardly to again close the nozzle outlet. Hence, the total air pressure within the first stage regulator will be increased in accordance with the increase in water pressure.

It is a feature of the present invention to provide a first stage regulator which requires no manual adjustment to obtain a predetermined pressure at the output thereof.

It is a further feature of the present invention to provide a first stage air pressure regulator which automatically increases the output air pressure in accordance with the increase in the ambient water pressure.

Another feature of the present invention is to provide a first stage air pressure regulator wherein a biasing spring operates to maintain the valve open rather than closed.

The above and other objects and features of the present invention will become more apparent from a consideration of the following detailed description taken in conjunction with the drawings in which:

FIG. 1 is a perspective view of a tank of compressed air having the first stage air pressure regulator of the present invention mounted thereto;

FIG. 2 is an enlarged sectional view of the first stage regulator of the present invention taken along the line 2—2 of FIG. 1, showing the input and output connections in dotted lines;

FIG. 3 is an exploded view of the first stage air pressure regulator of the present invention; and FIG. 4 is a diagrammatic vertical sectional view of a second embodiment of the present invention.

It is to be understood tht similar numbers in the various figures indicate identical elements.

FIG. 1 illustrates the first stage regulator of the present invention, denoted generally by the numeral 10, with a yoke 12 secured to an intermediate portion thereof. The yoke 12 is adapted to be placed about the neck 14 of a tank of compressed air 16 and to be clamped in place by a screw 18, having a transverse handle 19 at the end thereof, threaded in yoke 12, the lower end of which abuts neck 14 of the tank. Neck 14, has the usual opening therein (not shown) for communicating with the input passage 20 of the present device. An exhaust hose 40a connects the output of regulator 10 to the second stage regulator (not shown).

As illustrated in FIG. 2, regulator 10 comprises a circular casing 23 having an upper axial bore 34 and a lower axial bore 33 therein. The external ends 23a and 23b of casing 23 are chamfered. An annular flange 85, containing a plurality of concentric grooves on the upper surface thereof, overlies bore 33 and forms an axial connecting passage 37 between bore 33 and bore 34. Bore 34 has a substantially larger cross section than bore 33. The lower part 22 of bore 33 is threaded to receive the threaded portion 21d of a bushing 21 therein.

Bushing 21 has four stepped portions 21a, 21b, 21c and 21d. Input passage 20 is axially located in portion 21a. As shown in FIG. 2, portion 21a is received within the opening in shaft 14 which communicates with the compressed air supply, with the outer surface of shaft 14 abutting the lower surface of portion 21b. The respective ends of laterally extending arms 12a of yoke 12 abut portion 21c and the sides abut the top of the portion 21b to secure the unit in place. As noted above, portion 21d is threaded to be threadably received in threaded opening 22 in casing 23.

A downwardly perpendicularly extending annular recess 24 is formed in the upper portion of bushing 21 thereby defining an annular lip 25. An upwardly perpendicularly extending post 26 projects axially from the surface of recess 24 past the top surface of lip 25 into bore 33 and ends just below the horizontal plane of the lowest surface of flange 85. The upper portion of post 26 is beveled to impart a frusto-conical shape to this end portion. Bushing 21 contains an axial passage 27 therethrough. As illustrated in FIG. 2, the lower portion of axial passage 27 tapers downwardly and outwardly to an axial bore 28. An axially located annular groove 29, having a diameter slightly larger than bore 28 or passage 20, connects the bore with the passage. A circular filter 30, preferably of the so-called sintered filter variety, is seated within bore 28 and extends transversely across the tapered opening of passage 27. The filter is maintained in place by a C clamp 31 which abuts the bottom surface of filter 30 and seats within groove 29. The upper portion of axial passage 27 tapers inwardly and upwardly into an axial passage of a smaller diameter than that passing through the main portion of bushing 21, thereby forming a nozzle outlet 27a at the top of post 26. Portions 32a and 32b on surface 21b of bushing 21 are made flat to facilitate gripping by a wrench when the bushing and casing 23 are assembled. Recess 24 and lip 25 form the lower surfaces of a lower axial chamber 86 having side walls formed by bore 33 and an open upper end formed by flange 85.

A threaded aperture 39 in casing 23 communicates with chamber 86. Aperture 39 receives a threaded nut 40 (shown by the dotted lines in FIG. 2) therein which is connected to the end of an exhaust hose 40a, thereby connecting the exhaust hose to chamber 86.

A circular insert 46 having an annular groove 47 about the periphery thereof is received within bore 34 with the side walls of the insert abutting the walls of bore 34. As shown in FIG. 2, a downwardly perpendicularly extending annular recess 48 is formed in the top surface of insert 46 thereby defining an annular lip 49. The bottom surface of recess 48 contains a plurality of grooves therein. Similarly, an upwardly perpendicularly extending recess 50 is formed in the bottom surface of insert 46 thereby defining an annular lip 51. The bottom surface of recess 50 likewise contains a plurality of grooves therein (FIG. 2). Lip 51 rests on the bottom surface of bore 34. An axial passage 52 extends downwardly perpendicularly from recess 48, sloping downwardly inwardly at 52a to downwardly perpendicularly extending axial passage 52b, which connects to recess 50. In the preferred embodiment axial passage 52b will have the same diameter as passage 37. A flexible diaphragm 53 is received within recess 50 and a flexible diaphragm 54, which lies in a plane parallel to the plane of diaphragm 53, is received within recess 48. Since lip 51 abuts the bottom of bore 34 the outer edges of diaphragm 53 are compressed between the lower surface of recess 50 and the bottom of bore 34 and the upper part of flange 85 with the grooves in recess 50 and flange 85 gripping these outer edges. The diaphragms define an intermediate chamber between their facing surfaces, the side walls of which are defined by surfaces 52, 52a and 52b, with the actual flexible area of diaphragm 54 being greater than that of diaphragm 53. Moreover, diaphragm 53 extends transversely across passage 37 thereby sealing lower chamber 86.

A transversely extending passage 41 is formed in casing 23 and connects groove 47 to the surroundings while a similar passage 68 is formed in insert 46 and connects groove 47 to the above noted intermediate chamber. Groove 47 is provided to eliminate the need for aligning passages 68 and 41 when the device of the present invention is assembled.

The upper part 35 of bore 34 is threaded to receive a threaded sealing ring 63 therein. Sealing ring 63 has an upwardly inwardly sloping axial recess 64 in the under side therein, and a plurality of indentations 65 on the top surface thereof. Recess 64 defines an annular lip 66, which has a plurality of grooves therein, on the under side of sealing ring 63. Indentations 65 may receive a tool therein to facilitate tightening sealing ring 63 in bore 34 until lip 66 abuts lip 49. The grooves in lip 66 and recess 48 compress and pinch the outer edges of diaphragm 54 thereby maintaining the outer edges of the diaphragm in place when it flexes. A double keyhole slot 67 is formed in the bottom of recess 64, with the keyhole portions 67a sloping downwardly and outwardly, as shown in FIG. 2. In the preferred embodiment, the largest diameter of recess 64 will be approximately the same as the diameter of passage 52. Diaphragm 54 extends transversely across recess 64 to effectively seal the open end of the axial chamber defined by the surfaces of recess 64. Thus, the unit of the present invention will comprise a lower chamber and an upper chamber whose minimum cross section is greater than the cross section of the lower chamber.

A valve member 42, having a hollow downwardly perpendicularly extending portion 43 and a transversely extending head 44 is slidably received on post 26. Head 44 contains a horizontal slot 44a on the upper surface thereof and hollow portion 43 contains a plurality of apertures 43a at the upper end thereof. Head 44 extends past portion 43 thereby forming an outwardly transversely extending flange on the under side of the head. The length of portion 43 is such that the under side of head 44 can abut nozzle outlet 27a with the bottom surface of portion 43 being out of contact with recess 24. A compression spring 45 surrounds portion 42 with one end abutting the flange formed by the under side of head 44 and the other end seating within recess 24.

A piston 55 is contained within the intermediate chamber defined by diaphragms 53, 54 and surfaces 52, 52a and 52b. The upper circular portion 55a of piston 55 abuts diaphragm 54 and is of slightly smaller diameter than passage 52. Portion 55a contains a plurality of concentric grooves about the center thereof. The lower circular portion 55b of piston 55 abuts diaphragm 53 and is of slightly smaller diameter than passage 52b. Portion 55b likewise contains a plurality of concentric grooves about the center thereof. Portion 55b extends a greater distance upwardly perpendicularly than passage 52b. Hence, piston 55 will be free to move axially within the intermediate chamber.

Diaphragms 54 and 53 contain the respective axial passages 56 and 57 therein. Similarly, an axial passage 58 is contained within piston 55, in alignment with passages 56 and 57. A hollow shaft 59 has an outwardly extending flange 60 and an annular step 61 at the end thereof. The under side of flange 60 contains a plurality of concentric grooves therein. Shaft 59 seats within the passages 56, 57 and 58, with flange 60 abutting the bottom surface of diaphragm 53 and the step 61 received within passage 57. A washer 62, having concentric grooves on the under side thereof and having a downwardly perpendicularly extending protruding portion 62a abuts diaphragm 54 with portion 62a being received in passage 56 and shaft 59 being received in the aperture in washer 62. The upper end 59a of shaft 59 tapers upwardly and outwardly thereby preventing removal of washer 62 from shaft 59. Hence, diaphragm 54 is firmly compressed between the under side of washer 62 and portion 55a and diaphragm 53 is firmly compressed between portion 55b and the under side of flange 60. Hence, piston 55, shaft 59, diaphragm 53 and 54, and washer 62 will move axially as a unit.

Having described a first preferred embodiment of the present invention its operation will now be set forth. If it is assumed that no air is required (i.e., if the diver is exhaling), then the passage through aperture 39 will be effectively closed. The compressed air coming from shaft 14 will enter chamber 20 and proceed through filter 30 and axial passage 27 in the direction indicated by the arrows 70. The pressure of this compressed air, together with the force exerted by spring 45 will force valve member 42 upwardly away from nozzle outlet 27a and into abutment with flange 60. The compressed air will then flow through apertures 43a in extension 43, as shown by the arrows 71, to fill chamber 86 with the air. Since the passage through aperture 39 is effectively shut, the air will flow through slot 44a in head 44, through the passage in hollow shaft 59, into the upper chamber defined by recess 64 and the upper surface of diaphragm 54, as indicated by arrows 72. As the pressure of the air in this chamber begins to increase, diaphragm 54 will flex downwardly, thereby moving diaphragm 53 downward since, as noted above, the diaphragms move as a unit through the connection of piston 55. Flange 60, which abuts the lower surface of diaphragm 53, is also in abutting engagement with head 54 and will begin to force valve member 42 downward against the force of the compressed air coming out of outlet 27a and the action of spring 45. When the pressure of the air in the upper chamber becomes great enough, the downward flexing of the diaphragms will cause the under side of head 44 to abut nozzle outlet 27a thereby effectively sealing off outlet 27a and preventing the further emergence of compressed air. Hence, by properly designing the flexible areas of the diaphragms and utilizing a spring of a predetermined force, the pressure in chamber 86 will always be maintained at the same level (when the outlet is closed) without the need of manually adjusting any elements in the present invention.

When there is a demand for air, the pressure in the exhaust hose will suddenly drop, hence the air which has built up in chamber 86 will now be exhausted through aperture 39. This sudden drop in pressure will allow the air which had heretofore been contained in the upper chamber to be released through aperture 39. Thus, diaphragm 54 will return to its normal unflexed position since the forces exerted by the entrapped air are no longer present thereby moving diaphragm 53 upwardly and hence, valve member 42 will be forced upwardly due to the release of the pressure on the upper surface of head 44. Hence, air will now flow through passage 27 into chamber 86, as noted hereinabove, until the outlet through aperture 39 is again closed.

It is a well known fact that the pressure of the water increases as a person goes to greater depths. In order to maintain the same differential pressure at the lungs of the diver as he submerges, the pressure of the air at the output of the present device (i.e. passing through aperture 39) will have to be increased. Thus, water will enter the intermediate chamber in insert 46 through aperture 41 in casing 23, groove 47 in insert 46, and through passage 68. Since the flexible area of diaphragm 54 is greater than the flexible area of diaphragm 53 (that is, the diameter of passage 52 is greater than the diameter of passage 52b) the net force exerted by the the diameter of passage 52b) the net force exerted by the water will be in an upward direction as taken in FIG. 2. Hence, the pressure in the upper chamber defined by recess 64 and diaphragm 54 will not only have to overcome the force of the compressed air from outlet 27a and spring 45, but will also have to overcome the force of the water pressure in order to seal nozzle outlet 27a. Thus, the pressure of the air in chamber 86 will automatically be increased as the diver submerges.

It is to be specifically noted that spring 45 exerts a force in the direction to open valve member 42, thereby increasing the efficiency of the present invention. For example, when the tank of compressed air is full, it may be assumed that the air will exert a force of approximately 3 pounds against the valve member. When the air in the tank is nearly exhausted this lifting force drops to a few ounces. If no spring were present, or if the spring operated to close the valve rather than open it, the percentage change in the drop in the output pressure will be the same as the drop in the lifting force. If, as in the present invention, a spring is included to bias the valve open and the spring exerts a force of, for example, 30 pounds; then the drop in the force applied to the valve member will be from 33 pounds to 30 pounds. This results in a 9% change only in the output pressure between a full and nearly empty tank of compressed air.

The device of the present invention may very easily be disassembled by unscrewing sealing ring 63 and removing insert 46. Similarly, bushing 21 may be removed by unscrewing it from casing 23. The various parts of the invention may then be taken apart and cleaned and be reassembled in the reverse order. It is to be specifically noted that no manual adjustments need be made to the pressure determining elements to maintain the same pressure at the output of the device as was present when the unit was first disassembled. The filter may be removed and replaced or may be cleaned simply by removing C clamp 31.

A second embodiment of the present invention is shown diagrammatically in FIG. 4. The input nozzle 126 has an axial passage 127 therein and is connected to the compressed air supply. A lower chamber 186 and an upper chamber 164 are formed in a casing 123. The cross section of chamber 186 is smaller than the cross section of chamber 164. A pair of diaphragms 153 and 154 respectively extend transversely across the open ends of chambers 186 and 164 and define an intermediate chamber between their facing surfaces. A piston 155 is contained within this intermediate chamber and has an upper portion 155a having a large cross section and a lower surface 155b having a smaller cross section. The cross section of surface 155a and the cross section of portion 155b are slightly smaller than the cross sections of the respective chambers 164 and 186 so the piston will be free to move vertically within this intermediate chamber. An outlet aperture 139 in casing 123 communicates with chamber 186 while an aperture 141 in casing 123 communicates with the intermediate chamber. A spring 145 surrounds post 126 within chamber 186 and abuts the lower surface of diaphragm 153. A circular disk 144 is connected to the lower surface of diaphragm 153 in alignment with passage 127.

An aperture 73 in casing 123 communicates with chamber 164. An output or exhaust hose 140 is received in aperture 139 and a hose 74 connects this output hose to aperture 73.

If it is assumed that the diver is exhaling, then there will be no demand for air and the pressure in hose 140 will maintain an equilibrium status. Compressed air flows through passage 127 into passage 133, through aperture 139 into hose 140, and through hose 74 and aperture 73 into chamber 164. The pressure of the air building up in this chamber will cause diaphragm 154 to flex downward thereby transmitting this motion to diaphragm 153 through piston 155. As the pressure increases diaphragm 153 will be forced down against the action of the compressed air in passage 127 and spring 145 until disk 144 abuts the top of post 126 thereby sealing off passage 127. Hence, the pressure of the air in output hose 140 will be determined solely by the area of the flexible portion of the diaphragms and the force exerted by spring 145. Water pressure compensation is achieved through aperture 141 in the same manner as that described above. Likewise, in accordance with the operation of the embodiment described above, when air is needed the pressure in hose 140 will drop thereby allowing the diaphragms to flex upward into their normal position.

While I have described preferred embodiments of the device of the present invention it will become apparent to those skilled in the art and modifications may be made therein without departing from the scope of the invention. Therefore, I do not wish to be limited by the above description but only by the claims annexed hereto.

What is claimed is:

1. A device for first stage regulation of the pressure of a compressed air tank, comprising means forming a hollow housing having an axis and an inlet on said axis for connection to said tank, first and second flexible diaphragms respectively extending in spaced parallel relation across the interior of said housing transversely to said axis to divide it into a first chamber on the side of said first diaphragm adjacent said inlet, a second chamber on the side of said second diaphragm remote from said inlet, and an intermediate chamber between said diaphragms, said second flexible diaphragm being of substantially greater flexible area than said first diaphragm, said first chamber having an outlet, air communication means between said first and second chambers, said housing having a passage between said intermediate chamber and the outside of said housing, an axial piston in said intermediate chamber connected to said diaphragms so that their axial movements are in unison, said inlet comprising a post having an axial passage therein extending perpendicularly into said first chamber from the bottom surface of said first chamber and having a nozzle outlet at the end thereof, valve means comprising a hollow lower portion slidably received on said post and a transverse head portion extending outwardly past said hollow portion to define the flange on the under side of said head and being movable between a valve opened position and a valve closed position whereby the under side of said head abuts said nozzle outlet to prevent the air from flowing out of said outlet, biasing means for biasing said valve means to the valve open position wherein the top surface of said transverse head abuts said first diaphragm, said valve means being moved to said valve closed position by the flexing action of said diaphragms in response to an increased air pressure in said second chamber.

2. A device for first stage regulation of the pressure of a compressed air tank as defined in claim 1 wherein said biasing means comprises a compression spring surrounding said post and said valve means with one end of said spring abutting the bottom surface of the first chamber and with the other end of said spring abutting said flange.

3. In a first stage pressure regulator for a compressed air tank, means forming a housing having a first open-ended axial chamber of relatively small cross section and a second open-ended axial chamber of relatively large cross section therein, a first flexible diaphragm in said housing extending transversely across the open end of said first chamber, a second flexible diaphragm in said housing extending transversely across the open end of said second chamber and lying in a plane generally parallel to the plane of said first diaphragm, insert means in said housing having recessed top and bottom surfaces respectively receiving a different one of said first and second diaphragms and for maintaining the outer edges of said first and second diaphragms immovable, said insert means having an axial bore therethrough and being so constructed and positioned so that that portion of the bore said first diaphragm overlies is of relatively small cross section and that portion of the bore said second diaphragm overlies is of relatively large cross section, the facing surfaces of said diaphragms and the surfaces of said axial bore in said insert means defining an intermediate chamber, a passage in said insert means and said housing connecting said intermediate chamber to the ambient pressure, a piston in said intermediate chamber connected to the facing surfaces of said first and second diaphragms and said piston being movable in said intermediate chamber in an axial direction for transmitting flexing action of one diaphragm to the other diaphragm, a passage in said first and second diaphragms and said piston connecting said first and second chambers, an inlet comprising a post having an axial passage therein extending axially perpendicularly into said first chamber and having a nozzle outlet at the end thereof adapted to be connected to a tank of air under pressure for introducing the air into said housing, valve means connected to said nozzle outlet and movable between a valve open position whereby air is allowed to flow out of said nozzle outlet and a valve closed position whereby said nozzle outlet is sealed and being adapted to be moved to said valve closed position by the flexing action of said diaphragms in response to increased air pressure in said second chamber, biasing means for biasing said valve means to the valve open position, and an outlet in said first chamber adapted to be connected to a second stage regulator by an exhaust hose.

4. A fluid pressure regulator as defined in claim 3 wherein said valve means comprises a transverse head portion to define a flange on the underside of said head and wherein said biasing means comprises a compression spring surrounding said post with one end of said spring abutting the bottom surface of the first chamber and with the other end of said spring abutting said flange.

5. A fluid pressure regulator as defined in claim 3, said inlet further comprising an enlarged axial bore and an annular groove below said axial bore, a sintered filter in said enlarged axial bore, and a clamp in said annular groove abutting the surface of said sintered filter for maintaining said filter in place.

6. In a first stage pressure regulator for a compressed air tank, means forming a housing having a first open-ended axial chamber of relatively small cross section and a second open-ended axial chamber of relatively large cross section therein, a first flexible diaphragm in said housing extending transversely across the open end of said first chamber, a second flexible diaphragm in said housing extending transversely across the open end of said second chamber and lying in a plane generally parallel to the plane of said first diaphragm, insert means in said housing having recessed top and bottom surfaces respectively receiving said first and second diaphragms for maintaining the outer edges of said first and second diaphragms stationary, said insert means having a first axial bore therein communicating with said first diaphragm and extending perpendicularly toward the other surface of said insert means and having a cross section substantially equal to the cross section of the open end of said first chamber and having a second axial bore therein communicating with said second diaphragm and extending perpendicularly toward the other surface of said insert means and having a cross section substantially equal to the cross section of the open end of said second chamber, a sloping passage in said insert means connecting said first axial bore to said second axial bore, the facing surfaces of said diaphragms and the surfaces of the first and second axial bore and the sloping passage in said insert means defining an intermediate chamber, a passage in said insert means and said housing connecting said intermediate chamber to the ambient pressure, a piston in said intermediate chamber having a first surface having a cross section slightly smaller than the cross section of said first axial bore abutting said first diaphragm and a second surface having a cross section slightly smaller than the cross section of said second axial bore abutting said second diaphragm and being adapted to be axially movable in said intermediate chamber to transmit flexing action of one diaphragm to the other diaphragm, axially aligned passages in said first and second diaphragms and said piston connecting said first and second chambers, an inlet comprising a post having an axial passage therein extending axially perpendicularly into said first chamber and having a nozzle outlet at the end thereof adapted to be connected to a tank of air under pressure for introducing the air into said housing, valve means connected to said nozzle outlet and movable between a valve open position whereby air is allowed to flow out of said nozzle outlet and a valve closed position whereby said nozzle outlet is sealed and being adapted to be moved to said valve closed position by the flexing action of said diaphragms in response to increased air pressure in said second chamber, biasing means in said first chamber for biasing said valve means to the valve open position, and an outlet in said first chamber adapted to be connected to a second stage regulator by an exhaust hose.

7. In a fluid pressure regulator for a tank containing a fluid under pressure, means forming a housing having a first open-ended axial chamber of relatively small cross section and a second open-ended axial chamber of relatively large cross section therein, a first flexible diaphragm in said housing extending transversely across the open end of said first chamber, a second flexible diaphragm in said housing extending transversely across the open end of said second chamber and lying in a plane generally parallel to the plane of said first diaphragm, insert means in said housing having recessed top and bottom surfaces respectively receiving said first and second diaphragms and maintaining the outer edges of said first and second diaphragms stationary, said insert means having an axial bore therethrough and being so constructed and positioned so the portion of the bore said first diaphragm overlies is of relatively small cross section and the portion of the bore said second diaphragm overlies is of relatively large cross section, the facing surfaces of said diaphragms and the surfaces of said axial bore in said insert means defining an intermediate chamber, a piston in said intermediate chamber being connected to the facing surfaces of said diaphragms and said piston being axially movable in said intermediate chamber to transmit flexing action from one diaphragm to the other, axially aligned passages in said first and second diaphragms and said piston connecting said first and second chambers, an inlet comprising a post having an axial passage therein extending axially perpendicularly into said first chamber from the bottom surface of said first chamber and having a nozzle outlet at the end thereof adapted to be connected to the supply of fluid under pressure for introducing the fluid into said housing, valve means comprising a hollow lower portion slidably received on said post and a transverse head portion extending outwardly past said hollow portion to define a flange on the under side of said head and being movable between a valve open position whereby the fluid is allowed to flow out of said nozzle outlet and a valve closed position whereby the under side of said head abuts said nozzle outlet to prevent the fluid from flowing out of said outlet, biasing means for biasing said valve means to the valve open position wherein the top surface of said transverse head abuts said first diaphragm, said valve means being moved to said valve closed position by the flexing action of said diaphragms in response to an increased fluid pressure in said second chamber, and an outlet in said first chamber adapted to be connected to an exhaust hose.

8. A fluid pressure regulator as defined in claim 7 wherein said biasing means comprises a compression spring surrounding said post and the valve means with one end of said spring abutting the bottom surface of the first chamber and with the other end of said spring abutting said flange.

9. A fluid pressure regulator as defined in claim 7, said inlet further comprising an enlarged axial bore and an annular groove below said axial bore, a sintered filter in said enlarged axial bore, and a clamp in said annular groove abutting the surface of said sintered filter for maintaining said filter in place.

References Cited by the Examiner

UNITED STATES PATENTS

| | | | |
|---|---|---|---|
| 323,364 | 7/1885 | Pfaudler | 137—505.22 |
| 1,795,201 | 3/1931 | Dashwood | 137—505.28 |
| 2,171,190 | 8/1939 | Polston | 137—505.23 X |
| 2,596,178 | 5/1952 | Seeler | 137—64 X |
| 2,904,264 | 9/1959 | Klaber | 137—505.38 X |
| 3,045,688 | 7/1962 | Fay | 137—63 |
| 3,076,475 | 2/1963 | Singer | 137—505.23 X |
| 3,147,761 | 9/1964 | Lecocq | 137—63 |

FOREIGN PATENTS 1,108,998  6/1961  Germany.

WILLIAM F. O'DEA, *Primary Examiner.*

ISADOR WEIL, *Examiner.*

H. WEAKLEY, *Assistant Examiner.*